W. E. KOCH.
FISH HOOK.
APPLICATION FILED OCT. 24, 1908.
940,465. Patented Nov. 16, 1909.
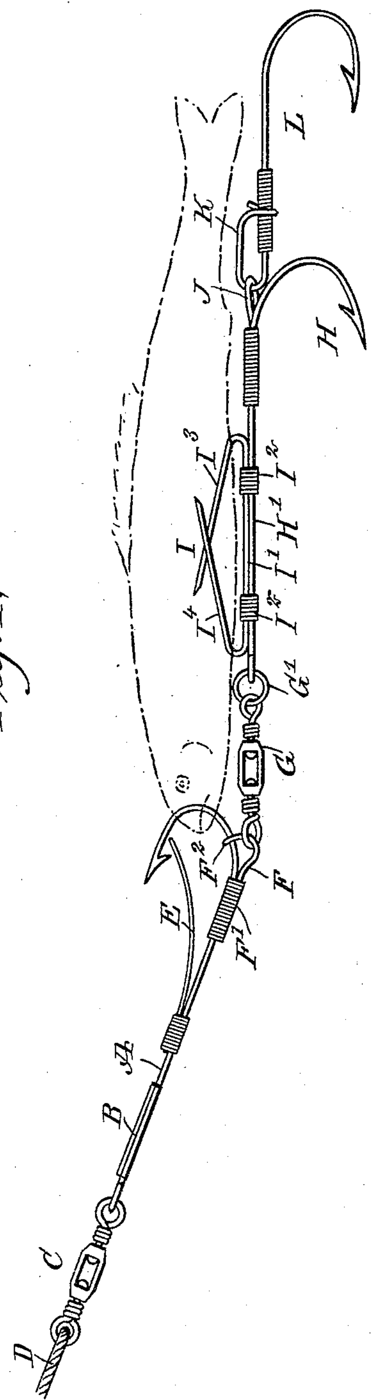
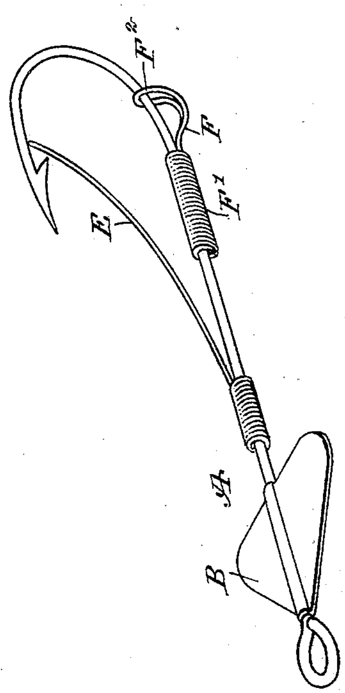
WITNESSES
Edward Thorpe.
INVENTOR
William E. Koch
BY Munn & Co.
ATTORNEYS

UNITED STATES PATENT OFFICE.

WILLIAM EDWARD KOCH, OF WHITEHALL, NEW YORK.

FISH-HOOK.

940,465. Specification of Letters Patent. Patented Nov. 16, 1909.

Application filed October 24, 1908. Serial No. 459,279.

*To all whom it may concern:*

Be it known that I, WILLIAM EDWARD KOCH, a citizen of the United States, and a resident of Whitehall, in the county of Washington and State of New York, have invented a new and Improved Fish-Hook, of which the following is a full, clear, and exact description.

The invention relates to fish hooks of the gang type, such, for instance, as shown and described in the Letters Patent of the United States, No. 787,679, granted to me April 18, 1905.

The object of the present invention is to provide a new and improved fish hook, arranged to dispense with the lead weight or sinker on the main hook, and to counterbalance the fish hook with a view to securely holding the live bait floating in an upright natural position, and to keep the main hook and the gang hooks in proper relation to each other.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a side elevation of the improvement; and Fig. 2 is an enlarged perspective view of the main hook.

The main fish hook is provided on its shank with a triangularly-shaped plate B and the forward end of the main fish hook A is connected by a swivel C with the line D. A tongue E attached to the shank of the main fish hook A extends with its free end close to the point of the fish hook, so as to prevent accidental disengagement of the minnow, frog or other bait hooked onto the main hook A, as indicated in Fig. 1.

On the rear end of the shank of the main fish hook A is arranged a loop F, preferably made from a piece of wire doubled up, the ends of the wire being fastened at F′ to the rear end of the shank of the main fish hook A, and the forward doubled up portion $F^2$ of the wire being bent apart for the passage of the bend of the main fish hook A, so that both ends of the loop are engaged with the main fish hook A, thus rendering the loop F exceedingly strong and durable. The loop F is connected by a swivel G and ring G′ with the forward end of a gang hook H, provided on its shank with a needle I having a shank I′ fastened at $I^2$ to the shank H′ of the gang hook H, and from the ends of the shank I′ extend the needle points $I^3$ and $I^4$ toward each other, and with the terminals crossing each other, as plainly indicated in Fig. 1. The points $I^3$, $I^4$ are adapted to engage the under side of the bait by first impaling the latter on one point, then moving it in the opposite direction, to engage the other point, thus securely holding the bait in an upright natural position in conjunction with the main hook A, as indicated in Fig. 1.

On the rear end of the shank H′ of the gang hook H is secured an eye J engaged by a clasp K held on a trail hook L, the clasp A being arranged to permit convenient attachment or removal of the trail hook L whenever it is desired to use or not use the said trail hook.

By having the fish hook arranged in the manner described it is well balanced to properly support the bait, such as minnows, dead or alive, in a natural position, and by having the loop F arranged in the manner described it is evident that it forms with the swivel G and the ring G′ a weight or sinker for the main hook A, to aid in weighting the latter and causing it to operate similarly to the corresponding main hook, shown and described in my Letters Patent above referred to.

Having thus described my invention, I claim as new and desire to secure by Letters Patent:

1. A fish hook, and a loop made of a piece of doubled-up wire and having one end secured to the hook shank, said loop being bent away from the bend of the hook and thence toward the bend of the hook, and encircling the same at a point remote from the bill of the hook for the purpose set forth.

2. A fish hook provided with a bait retaining needle having its shank secured to the shank of the fish hook, the shank terminating in points extending toward and crossing each other.

3. A main fish hook, a loop having one end secured to the shank of said main fish hook and the other end encircling the bend thereof, a gang hook, a swivel connection between the said loop and the said gang hook, and a bait retaining needle on the shank of the said gang hook.

4. A main fish hook, a loop on the said main fish hook, a gang hook, a swivel connection between the said loop and the said gang hook, a bait retaining needle having oppositely arranged points on the shank of the said gang hook, an eye on the said gang hook, and a trail hook having a clasp engaging the said gang hook eye.

5. A fish hook provided with a bait retaining needle consisting of a body portion secured to the hook, and having at each end a point, said points extending toward and crossing each other.

In testimony whereof I have signed my name to this specification in the presence of two subscribing witnesses.

WILLIAM EDWARD KOCH.

Witnesses:
MARY KOCH,
JULIA KOCH.